US007250131B2

(12) United States Patent
Lugovskoy et al.

(10) Patent No.: US 7,250,131 B2
(45) Date of Patent: Jul. 31, 2007

(54) METHOD AND A SYSTEM FOR HOT HYDROSTATIC PRESSING

(75) Inventors: Victor Lugovskoy, Kiryat Arba (IL); Vladimir Magaziner, Kiryat Ata (IL); Vitaly Chertkov, Kiryat Arba (IL); Guy Danieli, Jerusalem (IL)

(73) Assignee: MLC Extrusion Systems Ltd., Jerusalem (IL)

( * ) Notice: Subject to any disclaimer, the term of this patent is extended or adjusted under 35 U.S.C. 154(b) by 778 days.

(21) Appl. No.: 10/380,284

(22) PCT Filed: Sep. 11, 2001

(86) PCT No.: PCT/IL01/00859

§ 371 (c)(1),
(2), (4) Date: Jul. 29, 2003

(87) PCT Pub. No.: WO02/26409

PCT Pub. Date: Apr. 4, 2002

(65) Prior Publication Data

US 2004/0035167 A1 Feb. 26, 2004

(30) Foreign Application Priority Data

Sep. 29, 2000 (IL) ...................................... 138785

(51) Int. Cl.
*B29C 43/10* (2006.01)

(52) U.S. Cl. .......................................... 264/570; 72/60

(58) Field of Classification Search ................ 264/570; 72/60

See application file for complete search history.

(56) References Cited

U.S. PATENT DOCUMENTS 3,698,220 A 10/1972 Nilsson et al.
3,931,382 A 1/1976 Witkin

FOREIGN PATENT DOCUMENTS

JP 01269509 10/1989

*Primary Examiner*—Christina Johnson
*Assistant Examiner*—Monica A Huson
(74) *Attorney, Agent, or Firm*—The Nath Law Group; Jerald L. Meyer; Derek Richmond

(57) ABSTRACT

A method for hot hydrostatic pressing by means of working liquid which tends to become unstable within a transition time when in contact with a blank heated to a high working temperature and at a pressure lower than the liquid's stabilization pressure. The pressing of the blank heated to the high working temperature is carried out by raising the pressure of the working fluid to said stabilization pressure for a time shorter than the transition time. This is achieved by surrounding the heated blank by a cover adapted to delay the contact between the heated blank and the working liquid until the pressure in the working chamber is raised.

7 Claims, 2 Drawing Sheets

METHOD AND A SYSTEM FOR HOT HYDROSTATIC PRESSING

FIELD OF THE INVENTION

This invention relates to methods of extrusion and isostatic pressing and particularly to methods using high-temperature pressing.

BACKGROUND OF THE INVENTION

The invention belongs to the methods of hot hydrostatic pressing, wherein the blanks are heated to temperatures above the 600-700° C. range, such as hot extrusion of metals and sintered billets, HIP-ping (Hot Isostatic Pressure), hot compacting of powders and deposited powder materials, plastic deformation under high isostatic pressure, etc.

In the practice, hot blanks heated up to the above temperature range are pressed using such working liquids as special silicon oils and heat-resisting grease. At a higher temperature range, in the so-called "forging interval" about 1000-2000° C., it is known to press blanks and materials in a media of gases or colloid graphite.

Pressing in inert or reactive gases is performed in pressurized autoclaves (gasostats) at pressures up to 1500-2000 atm and temperatures up to 2000° C. A basic shortcoming of the "gas" pressing is the relatively low attainable pressure and the high complexity of the equipment. The power consumption per unit weight of the blank is high due to the great compressibility of the working gas and the impossibility to recuperate the compressed gas energy. Since the blanks are heated inside the gasostat, the working gas and the autoclave chamber are heated as well, contributing to energy losses.

The low attainable pressure in the "gas" pressing is a major limitation for such pressing methods as HIP-ping and compacting processes, where it significantly prolongs the seasoning time of the blank. A typical gasostat working cycle in such a process takes 6-8 hours. Besides, the low pressure prevents obtaining of high-quality compacted powders and deposited materials.

The pressing of hot blanks in "pseudofluid" media such as colloid graphite may be carried out at very high pressures and is energy-efficient since the "pseudofluid" has low compressibility. However, this media is characterized by a considerable internal friction, which makes the pressure non-uniform over the working volume. Colloid graphite is also prone to undesirable chemical reactions with the blank material.

JP 01269509 discloses a method of using a low-temperature working liquid for pressing resin powder at high temperature by filling the heated powder in a heat-insulated capsule with heat-insulated rubber cover and pressing the capsule in a hydrostatic press by means of said working liquid. Here the capsule and the cover protect the working liquid from contact with the heated powder during the whole processing time. Consequently, the method is limited to temperatures that a rubber cover may endure, e.g. 500-600° C.

SUMMARY OF THE INVENTION

The following is a Glossary of terms used in the present description and claims:

Hot hydrostatic pressing—a pressing operation on a heated blank by means of a working liquid, such as hot extrusion, sintering, compacting, hot isostatic pressure, etc.

Blank—any material, blank, detail, or preparation thereof in a container, capable of being pressed in heated state.

Contact—an immediate contact of the blank and the working liquid or a contact via a media not inhibiting substantially the heat transfer between the blank and the working fluid.

Working temperature—a temperature rendering the blank susceptible to hot hydrostatic pressing, i.e. making the blank plastic, sinterable, compactable, etc. at a given working pressure.

Working pressure—the pressure needed for hot hydrostatic pressing operation at a given working temperature.

Unstable (state of working liquid)—a state of a working liquid, wherein it evaporates vigorously, boils, inflames, explodes, chars, etc. on the surface of a heated blank and is thereby incapable of uniformly transmitting external (working) pressure to the blank.

Stable (state of working liquid)—a state of a working liquid, wherein it is capable of uniformly transmitting external (working) pressure to the blank.

Stabilization pressure—the minimal pressure for a given temperature, at which a working liquid is in stable state in the vicinity of a surface of a blank heated to that temperature.

High working temperature—working temperature in hot hydrostatic pressing at which the working liquid tends to transit into unstable state if its pressure is lower than the stabilization pressure.

Transition time—the time period during which a working liquid brought in contact with a blank heated to high working temperature, at pressure lower than the stabilization pressure, transits from stable to unstable state in the vicinity of the contact surface.

In accordance with the present invention, there is provided a method for hot hydrostatic pressing using a working liquid which tends to become unstable within a transition time when in contact with a blank heated to a high working temperature and at a pressure lower than the liquid's stabilization pressure, wherein the pressing of the heated blank is carried out at a working pressure not lower than the stabilization pressure, and the pressure of the working fluid is raised to said stabilization pressure during a time period after the contact that is shorter than the transition time.

This method allows the usage of cheap working liquids such as mineral oils with low internal friction for high-temperature and high-pressure hydrostatic pressing. The working liquid is of low compressibility and does not pose limitations to raising the working pressure. The method is energy efficient since only the blank needs to be heated; it is time efficient since the processing time, e.g. for curing defects, is less at higher temperatures and pressures, and there is no waiting period for cooling down of the press equipment between processing cycles.

It is known that when a liquid like oil or water is brought in contact with a hot surface, the liquid starts to evaporate very intensively forming a gaseous "cushion" at the contact interface. The gaseous cushion has low thermal conductivity, which retards further evaporation. If the surface is very hot, the liquid may start to boil, to burn, to explode, or to char, thus destroying the interface gaseous cushion in a short transition time. However, if the pressure of the liquid is sufficiently high, the gaseous interface layer may be stabilized even on a very hot surface. Based on this phenomenon, the method of the present invention is to raise rapidly the pressure of the working fluid, after it comes into contact with the hot blank, and reach a high stabilization pressure in a time shorter than said transition time.

The value of the stabilization pressure depends on the kind of working liquid and the blank temperature. Practically, it appears that a pressure of the order 6000-8000 atm is sufficient.

The transition time after the contact between the working liquid and the hot blank, in which the stability of the gaseous layer is lost if the stabilization pressure is not attained, also depends on the blank temperature and the working liquid properties. Practically, "safe" times for attaining the stabilization pressure appear to be less than tenths of a second.

In order to reduce the time for raising the pressure, the velocity of the press plunger has to be quite high, at least during the pressure gain stroke. This velocity depends on the volumes of the chamber and the blank, on the specific pressing process, etc. and in practice appears to be about 150-500 mm/s. During this time the power plant of the press must deliver huge power rates, for example, for a 1200 t press facility, at 200 mm/s velocity, the required power rate will be more than 2500 kW. A short-time pulse of such power rate can be conveniently delivered by a hydraulic press with a powerful accumulation station. A screw press with a flywheel may be also used if the flywheel is able to accumulate the necessary energy.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE EMBODIMENTS

Figure 1A:
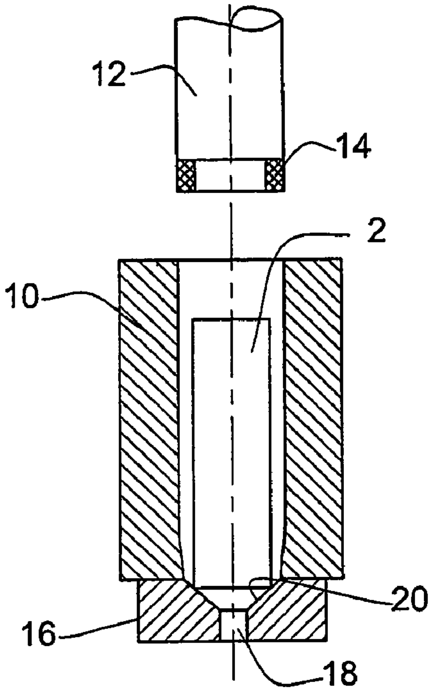
FIG. 1 is a schematic view of system for hot hydrostatic extrusion according to the invention.
Figure 1B:
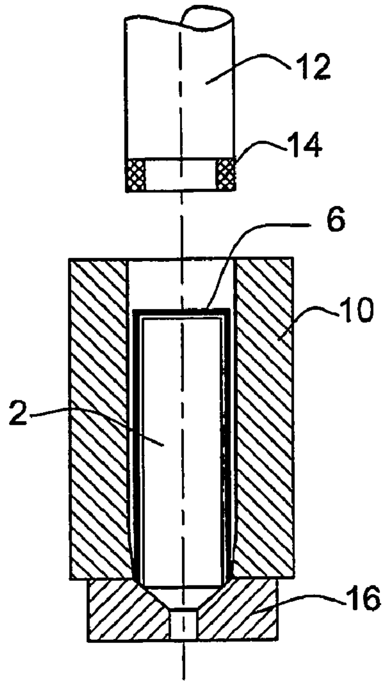
Figure 1C:
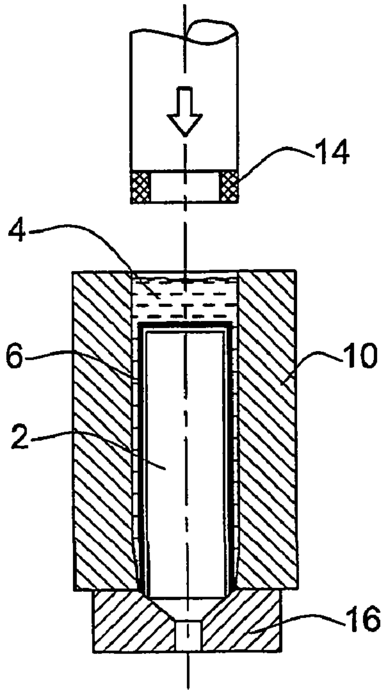

The method of the invention will be explained herein by means of three embodiments, with reference to the above drawings.

FIG. 1 shows a system for hot hydrostatic extrusion according to the invention and stages of the extrusion process performed on a heated blank 2 by means of a working liquid 4 and a metallic cover (capsule) 6. The extrusion is carried out in a hydraulic or other press having a working chamber 10, a plunger 12 movable into the chamber and sealed thereto by a seal assembly 14. The working chamber 10 is closed by an extrusion die 16 with an extrusion opening 18 and a guiding surface 20. The system is equipped with devices, not shown in the drawing, for heating the blank 2, for inserting the blank 2 and the capsule 6 in the working chamber 10, and for feeding the working fluid 4 into the working chamber.

At stage (a), a heated blank is inserted in the working chamber 10. At stage (b), the capsule 6 is inserted to encase the blank with a loose fit but tightly fitting the extrusion die 18. At stage (c), the working chamber is filled with the working liquid 4, and at stage (d), the plunger 12 moves into the working chamber 10 rapidly raising the pressure at least to the stabilization pressure.

When, at stage (d), the working liquid pressure rises, the metallic capsule 6 shrinks tight around the blank and starts to transmit uniformly the external pressure there upon. Also, a heat contact between the heated blank and the working liquid is established and intensive heat transfer starts via the metallic capsule 6. The heat transfer does not develop before the shrinkage, due to the insulating air gap between the capsule and the blank. From the moment of contact on, the pressure must be raised to the stabilization pressure during a time less than the transition time to the state of liquid instability.

Figure 1D:
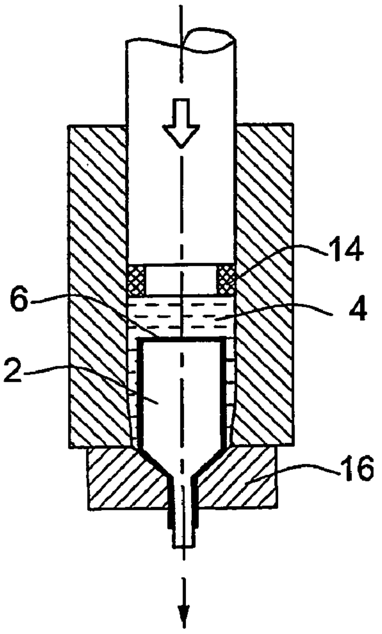

If the extrusion process requires a working pressure higher than the stabilization pressure, then the plunger moves further. Under the high working pressure, the blank 2 is extruded through the die opening 18, conducted by the guiding surface 20. Depending on other technological needs, the capsule 6 may be extruded together with the blank to form a surface layer thereon (as shown in FIG. 1*d*), or may remain and be smashed in the working chamber. In fact, the role of the capsule is to delay the moment of contact between the hot blank and the working liquid until a pressure level close to the stabilization pressure is reached, such that further raise of pressure to the stabilization pressure can take less time than the transition time. After the moment of contact, the capsule may be destroyed.

Figure 2:
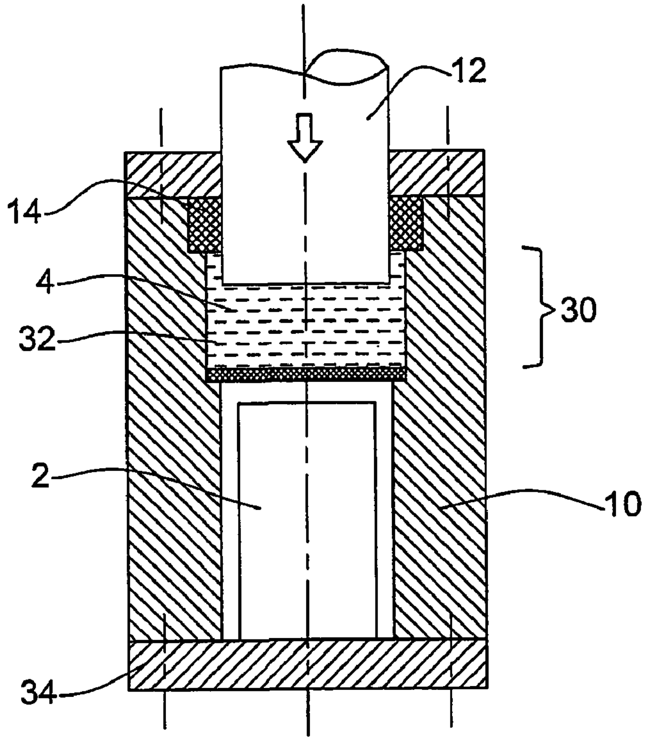
FIG. 2 is a first scheme for HIP-ping according to the invention.

FIG. 2 shows a scheme for HIP-ping performed on a heated blank 2 by means of a working liquid 4 according to a second embodiment of the invention. The HIP-ping process is carried out in a hydraulic or other press having a working chamber 10 with a forechamber 30, a plunger 12 movable into the forechamber and the working chamber through a seal assembly 14. The working chamber 10 is separated from the forchamber 30 by a breakable membrane 32, and is closed by a flange 34. The system is equipped with devices, not shown in the drawing, for heating the blank 2, for inserting the blank 2 into the working chamber 10, and for feeding the working fluid 4 into the forechamber 30.

In this case, the forechamber 30 is filled with working fluid 4 beforehand, the blank 2 is heated and inserted into the working chamber 10 with flange 34 removed. Then the flange 34 is secured in place and the plunger 12 is moved into the forechamber 30 to raise the pressure therein. Upon reaching some predetermined breaking pressure, the membrane 32 breaks open and lets the working fluid flood the working chamber 10 instantaneously and come into contact with the hot blank 2. The plunger 10 continues its motion and raises the pressure at least to the stabilization pressure level. Since, after membrane has been broken, the working liquid pressure is due first to fall, the breaking pressure is preferably higher than the stabilization pressure, such that after flooding the working chamber, the pressure can reach the stabilization pressure during a time less than the transition time to the state of liquid instability. Advantageously, in this embodiment, the plunger starts the final compression stroke from a position very close to the blank and with some accumulated inertia, which reduces the necessary time for achieving the stabilization pressure.

After establishing the required working pressure, the plunger stops and the HIP-ping process is carried out for the required time duration.

Figure 3:
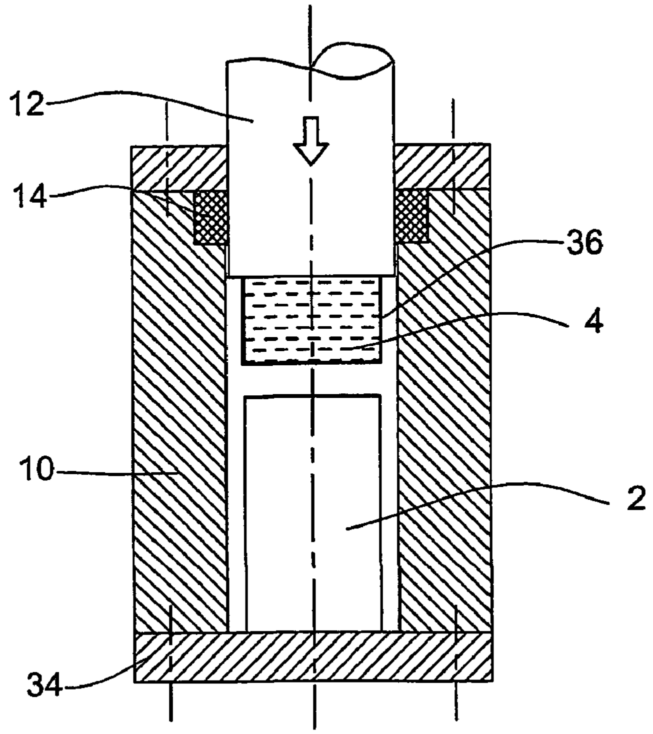
FIG. 3 is a second scheme for HIP-ping according to the invention.

FIG. 3 shows a scheme for HIP-ping according to a third embodiment of the invention. The HIP-ping process is carried out in a hydraulic or other press having a working chamber 10 with a plunger 12 movable into the working chamber through a seal assembly 14. The plunger carries at its leading end a container 36 made of thin deformable material and filled with working liquid 4. The working chamber is closed by a flange 34.

A blank 2 is heated and inserted into the working chamber 10 with flange 34 removed. Then the flange 34 is secured in place and the plunger 12 with the container 36 is moved into the working chamber 10. The container butts into the blank and starts to deform. Upon reaching some predetermined breaking pressure, the container 36 breaks open and lets the working fluid 4 flood the working chamber 10 instantaneously and come into contact with the hot blank 2. The plunger 10 continues its motion and raises the pressure at least to the stabilization pressure level. The further operation of this embodiment is essentially the same as in the second embodiment.

It is understood by a person skilled in the art that the above-described features of the invention may be easily combined within the frame of the basic ideas of the invention. For example, the breaking membrane or the breaking container of the second and third embodiment may be used in the hot extrusion process of the first embodiment, or the heated blank may be inserted in the working chamber either from above or from beneath.

The invention claimed is:

1. A method for hot hydrostatic pressing by means of working liquid which tends to become unstable within a transition time when in contact with a blank heated to a high working temperature and at a pressure lower than the liquid's stabilization pressure, wherein the pressing of the blank heated to said high working temperature is carried out by the working liquid at a working pressure not lower than said stabilization pressure, and the pressure of the working liquid is raised to said stabilization pressure during a time period after said contact that is shorter than said transition time, said method being carried out over a heated blank placed in a working chamber of a press filled with the working liquid, and comprising the step of providing conditions for reducing said time period, wherein said step includes:

forming a forechamber adjacent to the working chamber and isolated therefrom;

filling said forechamber with said working liquid;

raising the pressure of the working liquid in the forechamber to such level that, after said contact has been established, a further raise of pressure to the stabilization pressure takes less time than the transition time;

opening a passage for the working liquid from the forechamber to the working chamber.

2. A method for hot hydrostatic pressing according to claim 1 wherein the raise of pressure is performed by an arrangement having moveable mechanical parts and wherein said step includes setting said mechanical parts in motion, after which the inertia of said mechanical parts is used to accelerate said raise of pressure.

3. A system for hot hydrostatic pressing of a blank at a high working temperature by a method for hot hydrostatic pressing by means of working liquid which tends to become unstable within a transition time when in contact with a blank heated to a high working temperature and at a pressure lower than the liquid's stabilization pressure, wherein the pressing of the blank heated to said high working temperature is carried out by the working liquid at a working pressure not lower than said stabilization pressure, and the pressure of the working liquid is raised to said stabilization pressure during a time period after said contact that is shorter than said transition time; the system comprising:

a press with a working chamber, said chamber having a working liquid inlet for receiving the working liquid, and being adapted to receive at least one blank, a high-pressure arrangement capable of raising the pressure of the working liquid in the working chamber at least to said stabilization pressure during a time shorter than said transition time; wherein said high-pressure arrangement comprises a pressure accumulation forechamber sealingly separated from said inlet by a membrane, and said membrane is adapted to break when the pressure in the forechamber reaches a predetermined level, thereby flushing the working liquid into the working chamber.

4. A system for hot hydrostatic pressing according to claim 3, comprising:

a press with a working chamber adapted to receive at least one blank, a plunger capable of moving along the working chamber with sealing fit thereto, a sealed container with working liquid secured to the plunger at the side of the received blank, said container being adapted to break after colliding with the blank when the pressure in the container reaches a predetermined level, thereby flushing the working liquid into the working chamber, and said plunger being capable of further moving after flushing the working chamber, thereby raising the pressure of the working liquid at least to said stabilization pressure during a time shorter than said transition time.

5. A system for hot hydrostatic pressing according to claim 3, comprising a high-pressure arrangement with moveable mechanical parts adapted to be set in motion and accelerated before the working fluid is brought into contact with the heated blank, and to use thereafter the inertia of said motion for raising the pressure of the working liquid at least to said stabilization pressure, during a time shorter than the transition time.

6. A system for hot hydrostatic pressing according to claim 3, further comprising:

a deformable cover adapted to surround the heated blank and to allow a uniform transmission of pressure from the working fluid to the blank at least after the stabilization pressure is established, and a device to install said cover around the heated blank.

7. A system for hot hydrostatic pressing according to claim 6, wherein said system is adapted to perform hot extrusion, the working chamber has a die opening with a fitting element around said opening at the internal side of the chamber;

either the deformable cover or the blank is adapted to sealingly fit the fitting element, thereby enabling the extrusion of the blank through the die opening.

* * * * *